United States Patent [19]

Hasenauer et al.

[11] Patent Number: 4,581,306
[45] Date of Patent: Apr. 8, 1986

[54] STORAGE CELL CONNECTION

[75] Inventors: Dieter Hasenauer, Weinheim; Jens C. Jessen, Eppelheim, both of Fed. Rep. of Germany

[73] Assignee: Brown, Boveri & Cie AG, Mannheim, Fed. Rep. of Germany

[21] Appl. No.: 667,870

[22] Filed: Nov. 2, 1984

[30] Foreign Application Priority Data

Nov. 5, 1983 [DE] Fed. Rep. of Germany ....... 3340079

[51] Int. Cl.$^4$ .............................................. H01M 2/20
[52] U.S. Cl. .................................... 429/123; 429/158; 429/211; 429/156; 339/263 B
[58] Field of Search ............... 429/161, 156, 158, 123, 429/211, 104; 339/263 B, 224

[56] References Cited

U.S. PATENT DOCUMENTS

| | | | |
|---|---|---|---|
| 368,321 | 8/1887 | Bowe | 339/263 B |
| 1,201,215 | 10/1916 | Milliken | 339/263 B |
| 1,215,004 | 2/1917 | Decker | 429/158 |
| 1,358,717 | 11/1920 | Forbes | 429/156 |
| 1,460,969 | 7/1923 | Koretzky | 339/263 B |
| 1,543,017 | 6/1925 | Lea | 429/156 X |
| 1,723,727 | 8/1929 | Eckstein | 429/158 |
| 1,779,767 | 10/1930 | Gillingham | 429/156 X |

Primary Examiner—Anthony Skapars
Attorney, Agent, or Firm—Herbert L. Lerner; Laurence A. Greenberg

[57] ABSTRACT

Storage cell connection for at least two storage cells based on alkali metal and chalcogen with each cell having at least one anode space and a cathode space which are separated from each other by an alkali ion-conducting solid electrolyte and are bounded at least in some regions by a metallic housing, as well as are provided with at least one first and one second connecting element. At least one fastening element is provided on the surface of the housing, by means of which fastening element the first connecting element of the first storage cell can be locked, together with a second connecting element of the second storage cell on this surface. The second connecting element of the first storage cell is likewise designed for the detachable connection to the fastening element of a third storage cell.

25 Claims, 9 Drawing Figures

STORAGE CELL CONNECTION

BACKGROUND OF THE INVENTION

1. Field of the Invention

The invention relates to a storage cell connection for at least two storage cells based on alkali metal and chalcogen with each cell having at least one anode space and a cathode space which are separated from each other by an alkali ion-conducting solid electrolyte and are bounded at least in some regions by a metallic housing, as well as one first connecting element in electrical connection with a cathodic current collector and one second connecting element in electrical connection with an anodic current collector.

2. Description of the Prior Art

Rechargeable electrochemical storage cells with solid electrolytes are particularly suitable for construction of storage batteries having a high energy and power density. The solid electrolyte used in sodium-sulfur storage cells of beta aluminum oxide allows only sodium ions to pass. In contrast to the lead storage battery this means that practically no self-discharge takes place and no secondary reactions proceed during the charging, such as, for instance, water decomposition in lead-lead oxide systems. The current yield, i.e. the Faraday efficiency of such a sodium/sulfur storage cell is close to approximately 100%.

A multiplicity of such electrochemical storage cells are wired together for the manufacture of storage cells and high-temperature storage batteries. The high-temperature storage battery for an electric vehicle should, for instance, have an energy content of 40 kwh. If a total of 200 volts is to be generated with such a battery, about 500 storage cells must be wired together for the construction of the storage battery if it is assumed that each storage cell furnishes a voltage of about 2 volts.

Bus bars or cell jumpers which are made of and copper are used for the wiring, in particular the electrical connection of the storage cells to form such a battery. These bus bars and cell jumpers are protected against corrosion by plasma-injected aluminum or aluminum oxide layers. The connection of the storage cell to the bus bars or cell jumpers as well as the connection of the bus bars and cell jumpers among each other is accomplished by screws. It has been found that, due to the insufficient heat stability of copper, screw connections become loose and that this loosening cannot be prevented by the use of cup springs. Furthermore, an increased contact resistance is caused by the formation of oxide on the aluminum coating.

German DE-OS No. 30 33 117 discloses storage batteries in which cell jumpers or bus bars of aluminum clad steel or alloy steel connections are used for the wiring of the storage cells. However, here also, oxide formations occur which result in a large increase of the contact resistance.

The use of bus bars and cell jumpers of aluminum alloys, such as for instance, aluminum, copper, manganese alloys or aluminum magnesium alloys is likewise not suitable due to their low heat stability.

SUMMARY OF THE INVENTION

An object of the invention is to provide a detachable storage cell connection, wherein the connecting elements used therefor exhibit a very low ohmic resistance and can permanently withstand the operating conditions to which they are subjected without material increase in resistance.

With the foregoing and other objects in view, there is provided in accordance with the invention a storage cell connection for at least two storage cells based on alkali metal and chalcogen with each cell having at least one anode space and a cathode space which are separated from each other by an alkali ion-conducting solid electrolyte and are bounded at least in some regions by a metallic housing, as well as one first connecting element in electric connection with a cathodic current collector and one second connecting element in electric connection with an anodic current collector, which comprises; a fastening element on the surface of the housing of a first of said storage cells, by means of which the first connecting element of the first storage cell is locked together with a second connecting element of a second storage cell on the housing surface, and if an additional storage cell connection is desired, the second connecting element of the first storage cell is likewise detachably connected to a fastening element on the surface of the housing of a third storage cell.

Other features which are considered as characteristic of the invention are set forth in the appended claims.

Although the invention illustrated and described herein as embodied in a storage cell connection, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DESCRIPTION OF THE PREFERRED EMBODIMENTS

The invention will be explained in greater detail in the following with particular reference to the drawings.

Figure 1:
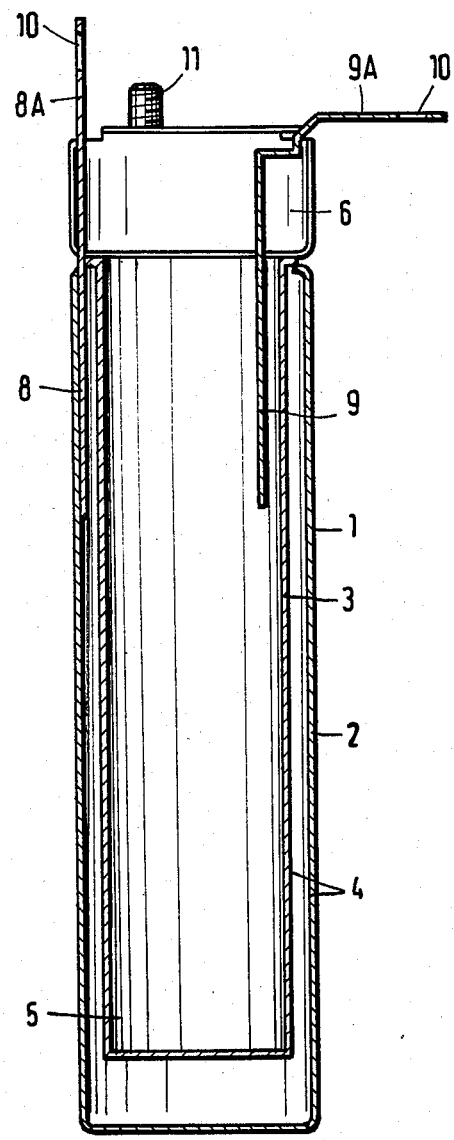
FIG. 1 diagrammatically illustrates a storage cell, designed for a detachable connection, with anodic and cathodic connecting elements.

The electrochemical storage cell 1 shown in FIG. 1 is formed by a metallic housing 2 and a solid electrolyte 3. The metallic housing 2 has the shape of a cup in the embodiment shown here. It is preferably made of aluminum. The solid electrolyte 3 is arranged in the interior of the cup-shaped metallic housing 2 and is likewise made in the shape of a cup. The dimensions of the solid electrolyte 3 are chosen to provide a space 4 all around the electrolyte between the inner boundary surfaces of the housing 2 and the outer boundary surfaces of the solid electrolyte 3. This space 4 is utilized as the cathode space 4. The interior of the solid electrolyte 3 serves as the anode space 5. The cathode space 4 is filled with a graphite felt saturated with sulfur (not shown here). The alkali metal, particularly sodium is contained in the anode space 5. A supply container 6 for sodium above the anode space 5 is in communication with the anode space 5 via one or several openings (not shown here). The supply container completely closes the opening of the anode space 5. A cathodic current collector 8 which is in the form of a rod protrudes into the cathode space 4. The current collector is brought up into the closing cap 7 of the storage cell and is connected there in an electrically conducting manner to an outward-pointing connecting element 8A. A current collector 9 also protrudes into the anode space 5. Collector 9 has the shape of a rod and is connected, electrically conducting, to an outward pointing connecting element 9A. The two connecting elements 9 and 9A are brought out at the upper end face of the storage cell 1. These connecting elements are arranged to be positioned in the edge region of the housing 2, specifically so they are located on a straight line which runs through the center of the end face. In the embodiment example shown here, the two connecting elements are made of highly heat-resistant copper-zirconium or copper-chromium or copper-chromium-zirconium. An equally good electrical connection between the storage cell 1 and further adjacent storage cells (not shown here) is obtained if the anodic and cathodic connecting elements 8A and 9A are made of precipitation-hardened copper or precipitation-hardened aluminum. The anodic and cathodic connecting elements 8A and 9A, made of a copper alloy or a precipitation-hardened copper have a corrosion-resistant coating which may be gold, silver, rhodium, chromium or nickel. If the two connecting elements 8A and 9A are made of precipitation-hardened aluminum, formation of oxide layers which are detrimental to the passage of current may occur. Therefore, the surfaces of the connecting elements 8A and 9A are advisably additionally provided with an electrically highly conductive coating which may consist, for instance, of gold, silver, rhodium, nickel or chromium. The coatings arranged may be applied on the entire or only partial surface of the connecting elements 8A and 9A. In a partial application of the corrosion-resistant coating, the coating is disposed in particular wherever there is to be a contact of the connecting elements 8A and 9A to a further connecting element, as for example, in the vicinity of the free ends of the connecting elements 8A and 9A. Here, a respective breakthrough 10 is provided, by which the respective connecting element 8A and 9A is connected to a further connecting element (not shown here), by means of a holding screw. In the embodiment example shown here, the connecting elements 8A and 9A are in the form of straps, whereby the large-area contact is improved when they are connected to further connecting elements 9A and 8A. An outward directed fastening element 11 is permanently held on the upper end face of the storage cell 1. Preferably, this fastening element 11 is made of metal, particularly aluminum in the form of a rod and is firmly connected to the housing 2 which is likewise made of metal. The cross section of the operating element 11 is adapted to the cross section of the breakthroughs 10, which are each provided at the free ends of the connecting elements 8A and 9A. In the embodiment example shown here, the fastening element 11 is positioned on a straight line connecting the two connecting element 8A and 9A. This fastening element 11 is provided for the electrically conducting connection of two storage cells. The fastening element 11 is positioned, as will be seen in FIG. 1, at a small distance from the cathodic connecting element 8A.

Figure 2:
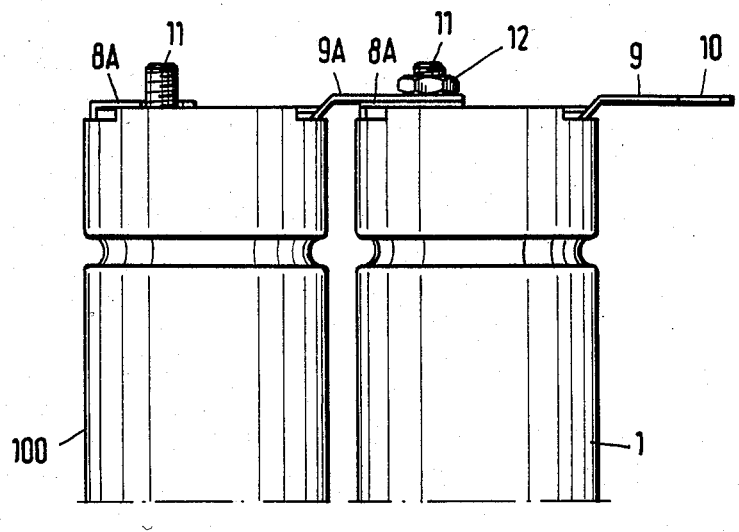
FIG. 2 shows two storage cells which are electrically wired together.

FIG. 2 shows the electrically conducting connection between two storage cells according to the invention. The two storage cells 1 and 100 correspond in design to the storage cell 1 shown in FIG. 1. For their electrically conducting connection, the two storage cells 1 and 100 are arranged in tandem such that the anodic connecting element 9A has a minimum distance from the fastening element 11 of the storage cell 1.

As already mentioned above, the anodic and cathodic connecting elements 8A and 9A are in the form of straps and have a breakthrough 10 at their free ends. For the electrical wiring, the cathodic connecting elements 8A are bent over the end face of the respective storage cell 1, 100 to make the straps 8A run parallel to the upper end face of the cell and in close contact with the upper end face. The breakthroughs 10 of the cathodic connecting elements 8A are positioned to enable the fastening elements 11 to come up through these breakthroughs 20 and thus be surrounded by the cathodic connecting elements 8A. The anodic connecting elements 9A are bent outward to likewise become parallel to the upper end face of the storage cell 1, 10. The two storage cells 1 and 100 which are to be connected to each other, are positioned to enable the fastening element 11 of the storage cell 1 to be pushed through the breakthrough 10 of the anodic connecting element 9A of the first storage cell 100. The anodic connecting element 9A of the storage cell 100 rests on the cathodic connecting element 8A of the storage cell 1. By means of a lock nut 12 which is screwed on an external thread of the fastening element 11, the connecting elements 8A and 9A which are pushed over the fastening element 11 are connected in an electrically conducting manner. The lock nut 12 is turned against the end face of the storage cell 1, 100 as far as possible to obtain good electrical contact.

Figure 3:
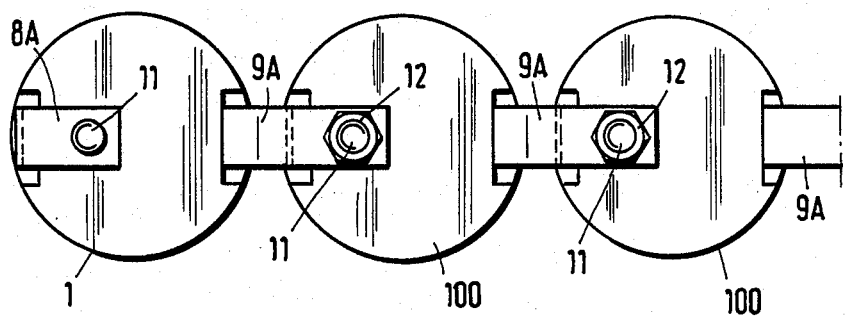
FIG. 3 is a top view of the two storage cells in FIG. 2.

In FIG. 3, electrochemical storage cells 1 and 100 are arranged in tandem, forming a row, and are connected to each other as described above in an electrically conducting manner. As is shown in FIG. 3 in a top view, the size of the spacing between the series-connected storage cells 1 and 100 can be fixed in the desired manner by appropriate choice of the length of the anodic connecting elements 9A.

Figure 4:
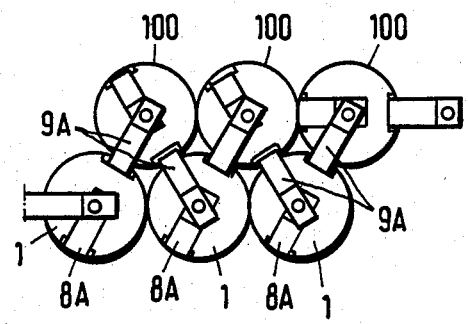
FIG. 4 shows several storage cells electrically connected to each other in a top view.

Storage cells which have a minimum spacing are desirable particularly in the construction of a battery, in order that the dimensions of the battery be kept as small as possible and that an optimum number of storage cells be arranged in the interior of the battery. The storage cells are preferably positioned in a dense arrangement as shown in FIG. 4. In FIG. 4 can be seen the top view of six properly arranged storage cells 1 and 100. Here, three storage cells 1 are arranged in tandem, forming a row; three other storage cells 10 are arranged in the same manner. The row formed by the storage cells 100 extends parallel to the row of storage cells 1 and are positioned with each storage cell 100, at least in some regions, in a space formed between two storage cells 1. As can be seen with reference to FIG. 4, the storage cells 1 and 100 are designed so that the fastening elements 11 mounted at their end faces are always positioned in the middle of the end faces. The two connecting elements 8A and 9A of each storage cell 1 and 100 are arranged to lie on a common straight line which goes through the center of the end face. All cathodic connecting elements 8A are again bent parallel to the surface of the storage cell 1, 100, so that their breakthroughs 10 are penetrated by the fastening element 11 of the associated storage cell. The anodic connecting elements 9A are bent outward and are connected to the cathodic connecting elements 8A of the storage cell 1, thus connecting cells 1 and 100 in series. As can be seen by reference to FIG. 4, the storage cells 1 arranged there are wired so that the first storage cell 1 of the three storage cells 1 connected in tandem is connected to the first storage cell 100 of the three storage cells 100 arranged in tandem, in an electrically conducting manner. This first storage cell 100 of the second row is wired electrically to the second storage cell 1 of the first row, while the latter is wired to the second storage cell 100 of the second row and the same again to the third storage cell 1 of the first row. The third storage cell 1 again is connected electrically to the third storage cell 100. The storage cells which are positioned for the construction of the battery in such an arrangement, need not be wired in this manner, however. If desired, all storage cells 1 may be connected in series and form a further series connection with the storage cells 100.

Figure 5:
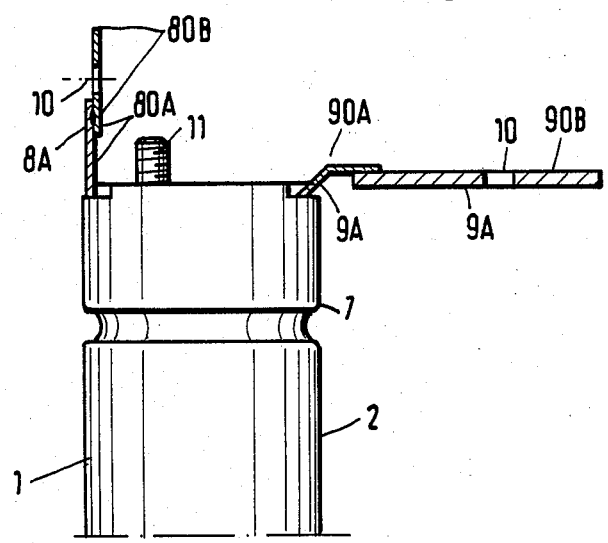
FIG. 5 is a variant of the electrochemical storage cell shown in FIG. 1.

A variant of the storage cell according to the invention is shown in FIG. 5. This storage cell is constructed substantially like the storage cell 1 shown in FIG. 1 and explained in the associated description. Differences consist only in the design of the cathodic and anodic connecting element 8A and 9A. In the embodiment shown here, the two connecting elements 8A and 9A are fastened in the upper lateral region of the closing cap 7 and specifically to lie on a straight line which runs through the center of the cover area of the closing cap 7. The cathodic connecting element 8A is made-up of two parts in the embodiment example shown here. In particular, the first subsection 80A, the one end of which is firmly connected to the storage cell 1, consists of pure aluminum, while the second subsection 80B adjoining it and which is provided in its end region with a breakthrough 10, is made of precipitation hardened aluminum. Also in this embodiment example, the cathodic connecting element 8A is in the form of straps and is bent inward for the electrical connection to a further storage cell, not shown here, so that the fastening element 11 of the storage cell goes through the breakthrough 10.

The anodic connecting element 9A is likewise in the form of a strap and has two subsections 90A and 90B. The subsection 90A connected to the storage cell 1 is made also here of pure aluminum, while the second subsection 90B which has the breakthrough 10 is made of precipitation hardened aluminum. The second subsection 90B is welded to the first subsection 90A. The two subsections 80B and 90B of the connecting elements 8A and 9A which are made of precipitation hardened aluminum are covered at least in some areas with a layer of gold, silver, rhodium, nickel or chromium, thereby preventing corrosion of the aluminum. If the subsection is to be partially coated, the region around the breakthrough 10 is preferably coated. The coating is applied, for instance, by means of an electroplating coating process. The fastening element 11 of the storage cell is arranged on the surface of the cover cap 7 to lie on a straight connecting line between the two connecting elements 8A and 9A and more specifically element 11 is positioned between the cathodic connecting element 8A and the longitudinal axis of the storage cell.

The embodiment examples in FIGS. 2, 3 and 4 show exclusively a series connection of storage cells. The arrangement of the connecting elements described in FIGS. 2, 3 and 4 is suitable for this type of wiring. For the construction of a storage battery, however, a certain number of storage cells must be connected in parallel. Bus bars are preferably used for this purpose. Such a bus bar is shown in detail in FIG. 6. The bus bar 20 is made substantially of aluminum and is designed in the shape of a strap. Only the regions 21, to which the connecting element 8A, 9A of a storage cell are to be connected are made of precipitation hardened aluminum. The areas 21 of the bus bar 20, which are provided to connect the connecting elements 8A and 9A, respectively, of the storage cells 11, are formed by strap-shaped subparts, which are made of precipitation hardened aluminum or steel and are permanently connected by means of resistance welding to the subelements of the bus bar 20, made of aluminum. The subparts 21 of the bus bar 20 has at least one hole with an internal thread (not shown). The connecting element 8A, 9A which can be connected to the bus bar, is arranged with its breakthrough 10 (not shown) above the opening of the hole in the subpart 21. The connecting elements 8A, 9A are connected to the bus bar 20 by means of a screw 22 which is turned into the hole (not shown).

For connecting electrochemical storage cells in parallel, all connecting elements 8A of the storage cells to be connected in parallel are screwed to a first bus bar 20 and specifically to its subpieces 21. For the electrical connection of the second connecting elements 9A, another bus bar, not shown, is used. By connecting the second anodic connecting elements 9A to the second bus bar, a parallel connection of the storage cells is accomplished.

Figure 7:
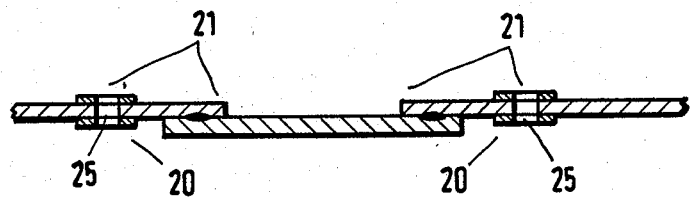
FIG. 7 is a variant of the bus bar shown in FIG. 6.

A further bus bar 20, in the form of straps, made essentially of aluminum or steel is shown in FIG. 7. Only the regions which can be connected to the connecting elements 8A, 9A of the storage cells, are formed by subpieces 21 which are made of precipitation hardened aluminum. The subpieces 21 are provided with a breakthrough 25 or a hole into which a screw can be turned, by which the connecting element of a storage cell can be fastened to a subpiece 21 of the bus bar 20. The subpieces 21 of the bus bar shown here are connected to the regions of the bus bar 20 made of aluminum or steel by means of friction welding. Preferably, in a connection of the subpieces 21 to the other regions of the bus bar 20, the subpieces 21 are fastened on the upper or lower side of the parts of the bus bar 20 made of aluminum or steel.

Figure 6:
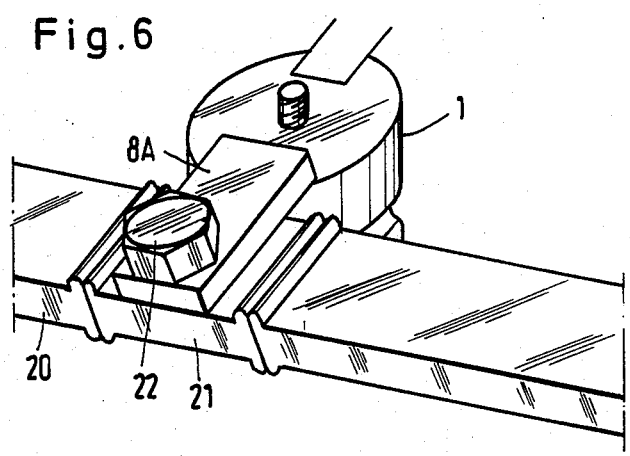
FIG. 6. shows a bus bar in connection with a connecting element of a storage cell.
Figure 8:
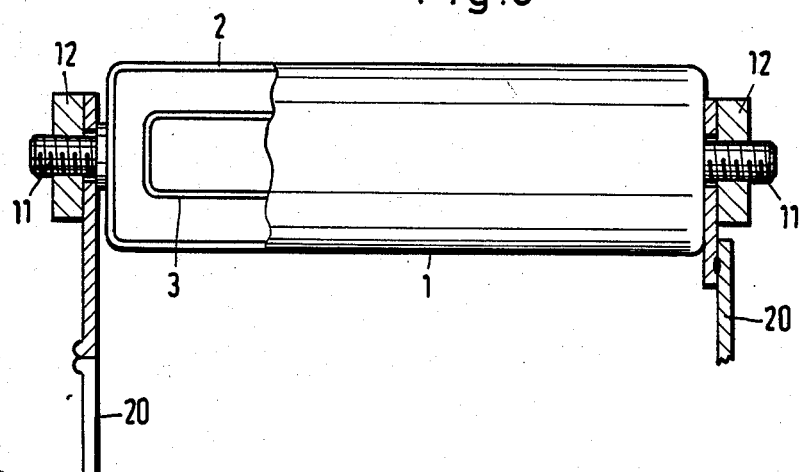
FIG. 8 is a further variant of the storage cell according to the invention.

FIG. 8 shows a storage cell 1 for inclusion of a horizontal arrangement of storage cells in a battery. The storage cell 1 is bounded by a metallic housing 2 which is of cup-shaped design. A likewise cup-shaped solid electrolyte 3 is arranged in the interior of the storage cell 1. The alkali metal is disposed within the solid electrolyte 3. The dimension of the solid electrolyte 3 are chosen to provide between its outer surfaces and the inside surfaces of the housing 2, a coherent space which is filled with a graphite felt (not shown) impregnated with sulfur. A rod-like fastening element 11 is firmly connected to the storage cell 1 at its first end. At the second other end of the storage cell, another rod-shaped fastening element 11 is arranged. The first fastening element 11 of the storage cell is connected to the cathodic current collector, not shown here. The second fastening element 11 is connected in an electrically conducting manner to the anodic current collector, not shown. The two fastening elements 11 can be connected via bus bars 20 which are described in FIGS. 6 and 7, to further storage cells (not shown here) in series or parallel. The fastening element 11 connected to the cathodic current collector is connected in the embodiment example shown here electrically by means of a lock nut 12 to the bus bar which is shown in FIG. 6 and explained in the associated description. The second fastening element 11 which is connected in an electrically conducting manner to the anodic current collector of the storage cell, is fastened to a bus bar 20 which is shown in FIG. 7 and further explained in the corresponding description, wherein the electrically conducting connection between the bus bar 20 and the second fastening element 11 is likewise accomplished with the aid of a lock nut 12 which is screwed onto the fastening element 11 and turned toward the lateral boundary surface of the storage cell 1.

Figure 9:
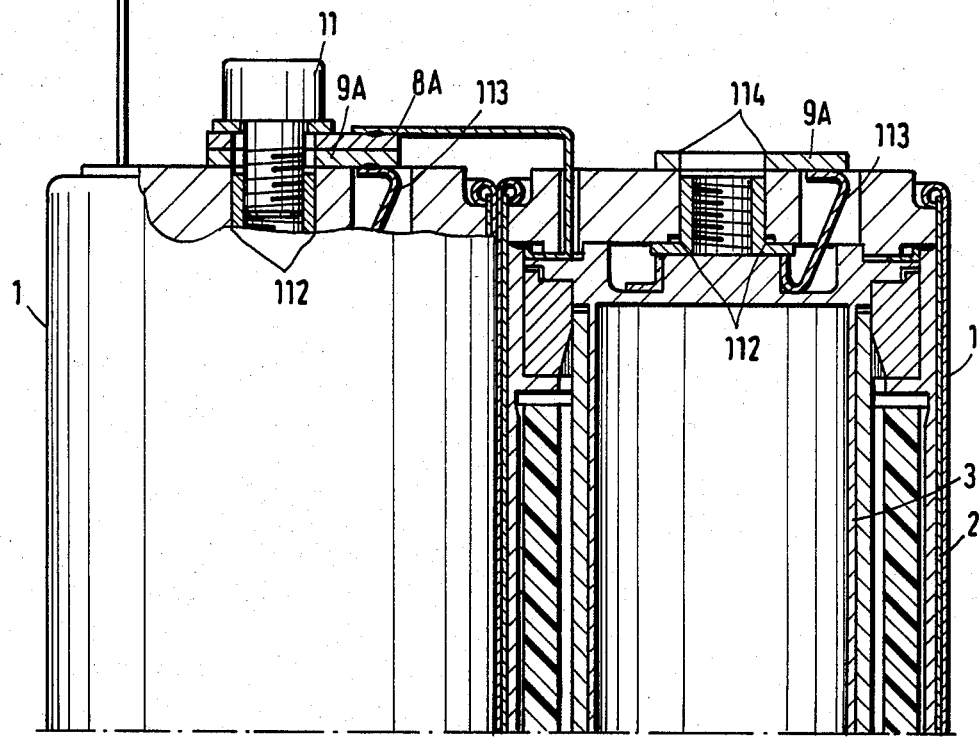
FIG. 9 is a variant of the connection shown in FIG. 2, of two storage cells.

FIG. 9 shows a variant with respect to the embodiment of the fastening element 11. In FIG. 9, two storage cells 1 are arranged side by side. Both storage cells are constructed substantially like the storage cells shown in FIGS. 1 and 2. Differences consist only in the design of the fastening element 11. As can be seen from FIG. 9, the fastening element is formed in these two storage cells by a screw 11, which can be screwed into a hole 112 in the end face of the storage cell 1. A hole 112 is arranged on both storage cells 1 and runs in the longitudinal axis of the storage cells 1. Each storage cell is provided with a cathodic connecting element 8A and an anodic element 9A. The cathodic connecting elements 8A are in the form of straps and are arranged in the outer area of the end face such that they can be bent outward and connected to the adjacent storage cell. In particular, the cathodic connecting elements 8A have, in the area of their free end, a breakthrough 10, the diameter of which is matched to the diameter of the hole 112 in the end face of the storage cell 1. The cathodic connecting elements 8A are bent outward to place the breakthroughs 10 above the opening 114 of the hole 112 of the adjacent storage cell. A washer serving as an anodic connecting element 9A is arranged around the opening 114 of each hole 112. The ring washer rests on the end face of the storage cell and is firmly connected thereto. An electric conductor 113, which is firmly connected to the boundary wall of the hole 112 and is in connection with the electrically conducting closing plate of the anode space 5 arranged within the solid electrolyte 3, is likewise connected in an electrically conducting manner to the undersurface of the anodic connecting element 9A. The cathodic connecting element of the storage cell which is to be connected in series with this storage cell is arranged so that not only is the breakthrough 10 arranged above the opening 114 of the hole 113, but that also the end of this strap-shaped connecting element 8A rests firmly on the anodic connecting element 9A. The cathodic connecting element 8A is pressed as hard as possible against the anodic connecting element 9A by means of the screw 11, which is screwed into the hole 112.

The foregoing is a description corresponding, in substance, to German application P No. 33 40 079.2, dated Nov. 5, 1983, international priority of which is being claimed for the instant application, and which is hereby made part of this application.

Any material discrepancies between the foregoing specification and the specification of the aforementioned corresponding German application are to be resolved in favor of the latter.

There is claimed:

1. Storage cell connection for at least two storage cells based on alkali metal and chalcogen with each cell having at least one anode space and a cathode space which are separated from each other by an alkali ion-conducting solid electrolyte and are bounded at least in some regions by a metallic housing, as well as one first connecting element in electrical connection with a cathode current collector and one second connection element in electrical connection with an anodic current collector which comprises; a fastening element on the surface of the housing of a first of said storage cells, by means of which the first connecting element of the first storage cell is locked, together with a second connecting element of a second storage cell on the housing surface of the first cell, and the second connecting element of the first storage cell is likewise adapted to be detachably connected to a fastening element on the surface of the housing of a third storage cell.

2. Storage cell connection according to claim 1, wherein the connecting elements of each storage cell is made of a metal selected from the group consisting of treated aluminum to improve its heat resistance and treated copper to improve its heat resistance and wherein the connecting elements are coated with a corrosion resistant layer at least in some regions.

3. Storage cell according to claim 1, wherein the connecting elements of each storage cell is made of a metal selected from the group consisting of a heat resistant aluminum alloy and a heat resistant copper alloy and wherein the connecting elements are coated with a corrosion resistant layer at least in some regions.

4. Storage cell connection according to claim 1, wherein the fastening element and the two connecting elements of each storage cell are arranged on one end face of the storage cell.

5. Storage cell connection according to claim 2, wherein the fastening element and the two connecting elements of each storage cell are arranged on one end face of the storage cell.

6. Storage cell connection according to claim 3, wherein the fastening element and the two connecting elements of each storage cell are arranged on one end face of the storage cell.

7. Storage cell connection according to claim 1, wherein the fastening element is shaped as a cylindrical rod which extends several millimeters beyond the end face of the storage cell to the outside and is provided with an external thread, onto which a lock nut is screwed.

8. Storage cell connection according to claim 4, wherein the fastening element is shaped as a cylindrical rod which extends several millimeters beyond the end face of the storage cell to the outside and is provided with an external thread, onto which a lock nut is screwed.

9. Storage cell connection according to claim 1, wherein the fastening element is formed by a screw which is screwed into a hole in the end face of the storage cell; wherein the opening of the hole is bounded by a washer placed on the end face which washer forms the anodic connecting element, and wherein the anodic connecting element is connected in an electrically conducting manner to the anode space and the boundary wall of the hole via a metallic conductor.

10. Storage cell connection according to claim 4, wherein the fastening element is formed by a screw which is screwed into a hole in the end face of the storage cell; wherein the opening of the hole is bounded by a washer placed on the end face which washer forms the anodic connecting element, and wherein the anodic connecting element is connected in an electrically conducting manner to the anode space and the boundary wall of the hole via a metallic conductor.

11. Storage cell connection according to claim 1, wherein each of the two connecting elements is in the form of a strap with a breakthrough at its end which locks with the fastening element; and wherein the cross section of the breakthrough is matched to the cross section of the fastening element to enable the fastening element to pass through the opening of the breakthrough.

12. Storage cell connection according to claim 4, wherein each of the two connecting elements is in the form of a rod or strap with a breakthrough at its end which locks with the fastening element; and wherein the cross section of the breakthrough is matched to the cross section of the fastening element to enable the fastening element to pass through the opening of the breakthrough.

13. Storage cell connection according to claim 1, wherein the connecting elements are made of a metal selected from the group consisting of a copper-zirconium alloy, a copper-chromium alloy, a copper-chromium-zirconium alloy and precipitation-hardened copper and are coated at least partially with a covering selected from the group consisting of gold, silver, rhodium, chromium and nickel.

14. Storage cell connection according to claim 4, wherein the connecting elements are made of a metal selected from the group consisting of a copper-zirconium alloy, a copper-chromium alloy, a copper-chromium-zirconium alloy and pecipitation-hardened copper and are coated at least partially with a covering selected from the group consisting of gold, silver, rhodium, chromium and nickel.

15. Storage cell connection according to claim 7, wherein the connecting elements are made of a metal selected from the group consisting of a copper-zirconium alloy, a copper-chromium alloy, a copper-chromium-zirconium alloy and precipitation-hardened copper and are coated at least partially with a covering selected from the group consisting of gold, silver, rhodium, chromium and nickel.

16. Storage cell connection according to claim 9, wherein the connecting elements are made of a metal selected from the group consisting of a copper-zirconium alloy, a copper-chromium alloy, a copper-chromium-zirconium alloy and precipitation-hardened copper and are coated at least partially with a covering selected from the group consisting of gold, silver, rhodium, chromium and nickel.

17. Storage cell connection according to claim 11, wherein the connecting elements are made of a metal selected from the group consisting of a copper-zirconium alloy, a copper-chromium alloy, a copper-chromium-zirconium alloy and precipitation-hardened copper and are coated at least partially with a covering selected from the group consisting of gold, silver, rhodium, chromium and nickel.

18. Storage cell connection according to claim 1, wherein the connecting elements are made of a metal selected from the group consisting of an aluminum-manganese alloy and a precipitation-hardened aluminum, and are coated, at least in some regions, with a covering selected from the group consisting of gold, rhodium, silver, nickel and chromium.

19. Storage cell connection according to claim 4, wherein the connecting elements are made of a metal selected from the group consisting of an aluminum-manganese alloy and a precipitation-hardened aluminum, and are coated, at least in some regions, with a covering selected from the group consisting of gold, rhodium, silver, nickel and chromium.

20. Storage cell connection according to claim 7, wherein the connecting elements are made of a metal selected from the group consisting of an aluminum-manganese alloy and a precipitation-hardened aluminum, and are coated, at least in some regions, with a covering selected from the group consisting of gold, rhodium, silver, nickel and chromium.

21. Storage cell connection according to claim 9, wherein the connecting elements are made of a metal selected from the group consisting of an aluminum-manganese alloy and a precipitation-hardened aluminum, and are coated, at least in some regions, with a covering selected from the group consisting of gold, rhodium, silver, nickel and chromium.

22. Storage cell connection according to claim 11, wherein the connecting elements are made of a metal selected from the group consisting of an aluminum-manganese alloy and a precipitation-hardened aluminum, and are coated, at least in some regions, with a covering selected from the group consisting of gold, rhodium, silver, nickel and chromium.

23. Storage cell connection according to claim 1, wherein the connecting elements are arranged on one end face of the storage cell and lie on a straight line going through the center of the end face.

24. Storage cell connection according to claim 1, wherein the fastening element is arranged on the end face of the storage cell on the longitudinal axis of the storage cell.

25. Storage cell connection according to claim 1, wherein the fastening element is arranged on the end face of the storage cell between the longitudinal axis of the storage cell and the fastening point of the cathodic connection element.

* * * * *